United States Patent [19]
Noguchi

[11] Patent Number: 5,385,767
[45] Date of Patent: Jan. 31, 1995

[54] GOLF CLUB SHAFT AND PRODUCTION METHOD THEREOF

[75] Inventor: Akira Noguchi, Tokyo, Japan

[73] Assignee: Daiwa Golf Co., Ltd., Tokyo, Japan

[21] Appl. No.: 873,969

[22] Filed: Apr. 24, 1992

Related U.S. Application Data

[63] Continuation of Ser. No. 456,976, Dec. 26, 1989, abandoned.

[30] Foreign Application Priority Data

Dec. 28, 1988 [JP] Japan .................. 63-169804[U]

[51] Int. Cl.⁶ .............................................. A63B 53/10
[52] U.S. Cl. ....................... 428/36.91; 273/80 R; 273/80 B; 428/34.5; 428/36.3; 428/902; 428/35.9; 428/36.4; 428/36.1
[58] Field of Search .............. 428/35.9, 36.4, 36.91, 428/34.5, 36.1, 36.3, 411.1, 902, 395, 365, 366, 367, 392, 368, 376, 377, 378, 396, 398, 408, 379; 156/189, 190, 191, 193; 273/80 R, 80 B, DIG. 23, DIG. 7

[56] References Cited

U.S. PATENT DOCUMENTS

| | | |
|---|---|---|
| 4,023,801 | 5/1977 | Van Auken ............... 273/80 B |
| 4,119,748 | 10/1978 | Verbauwhede ............... 428/36 |
| 4,135,035 | 1/1979 | Branen et al. ............... 428/377 |
| 4,757,997 | 7/1988 | Roy ............... 273/80 R |
| 5,049,422 | 9/1991 | Honma ............... 428/34.6 |

FOREIGN PATENT DOCUMENTS 63-46169 3/1988 Japan .
63-146671 9/1988 Japan .

Primary Examiner—Charles R. Nold
Attorney, Agent, or Firm—Kalish & Gilster

[57] ABSTRACT

A golf club shaft comprising a mandrel with a tapered surface as its outer circumference which is wound with three layers of prepreg sheets of high-strength fiber impregnate with synthetic resin. The middle layer is also wound with a separate string member. The inner layer fibers and the separate string member are arranged in a criss-cross pattern running generally in the longitudinal axial direction of the shaft. However, the fibers which are part of the middle and outer layers run unidirectionally only in the longitudinal axial direction of the shaft. No fibers run in a circumferential direction. In addition, the fiber and matrix of the outer layer become transparent after curing. Thus, even when the shaft is shrunk toward the center, no zigzag or wrinkles are generated in the string member found between the middle and outer layers nor in the outer layer fibers themselves. Also, no zigzagging, wrinkling, sagging or whitening occurs in the transparent outer layer which allows the design pattern of the string member to be seen. This increases the strength of the shaft and sufficient clamping stress by taping is provided. Finally, the safety of the club shaft is increased because the outer layer prevents exposure of the fibers and string member which decreases the chance of breakage.

10 Claims, 3 Drawing Sheets

GOLF CLUB SHAFT AND PRODUCTION METHOD THEREOF

This application is a continuation of application Ser. No. 07/456,976, filed Dec. 26, 1989, now abandoned.

BACKGROUND OF THE INVENTION

1. Field of the Invention

This invention relates to a golf club shaft and a production method thereof.

2. Description of the Prior Art

Recently, golf clubs provided with shafts made of fiber reinforced synthetic resin or synthetic resin have been developed, such as the one described in Japanese Utility Model Laid-open No. 63-46169.

FIG. 4 and FIG. 5 illustrate this conventional type of golf club shaft, in which 11 is an inner layer formed by winding prepreg sheets, or high-strength fiber impregnated with matrix.

The inner layer 11 has its periphery wound with a middle layer 13, and the middle layer 13 with a string member 15 made of amorphous fiber, carbon fiber or Kevlar fiber in the form of mesh.

The string member 15 is wound with prepreg sheets as an outer layer 17, comprising fiber and matrix which become transparent after curing, for example sheets of glass cloth.

As shown in FIG. 6, the conventional club shaft as described above has layers in good condition until the outer layer 17 is wound, but suffers zigzag A or wrinkles B on the string member 15 or mesh fiber 19 which forms the outer layer 17, after taping or curing, as shown in FIG. 7 and FIG. 8.

Another problem is sagging or whitening, which hides the braiding pattern formed by the string member 15 as shown in FIG. 8 C. In addition, when the surface of the outer layer 17 is polished, texture of the fiber 19 in the outer layer 17 can be seen depending on the direction of light, which results in defective appearance and sometimes declined strength.

SUMMARY OF THE INVENTION

The inventor has studied the above problems for solution and found the cause of zigzag or wrinkles on the string member 15 and fiber 19 in the outer layer 17. When the outer diameter of the shaft shrinks due to resin flow after taping, the fiber 19 wound in the circumferential direction of the outer layer 17 cannot shrink toward the center of the shaft and zigzags in the axial direction, causing the string member 15 to zigzag.

It was also found that sagging or whitening occurs where the clamp stress by taping is insufficient, which makes the braiding pattern formed by the string member 15 invisible, and that the texture of the fiber 19 in the outer layer 17 can be sometimes seen depending on the light direction when the surface of the outer layer 17 is polished.

The present invention was completed on the basis of the above knowledge. By having all fibers run either strictly or generally in the longitudinal axial direction of the shaft, and no fibers running in a circumferential direction, a number of objectives are achieved.

First, the current invention prevents the string member and the outer layer from zigzagging or wrinkling, thereby increasing the strength of the shaft.

Second, the present invention prevents zigzagging, wrinkling, sagging or whitening in the transparent outer layer, resulting in a clearer appearance of the string member forming a designed pattern.

DESCRIPTION OF THE PREFERRED EMBODIMENT OF THE INVENTION

The present invention will hereinbelow be described in further detail with reference to the embodiment in the accompanying drawings.

Figure 1:
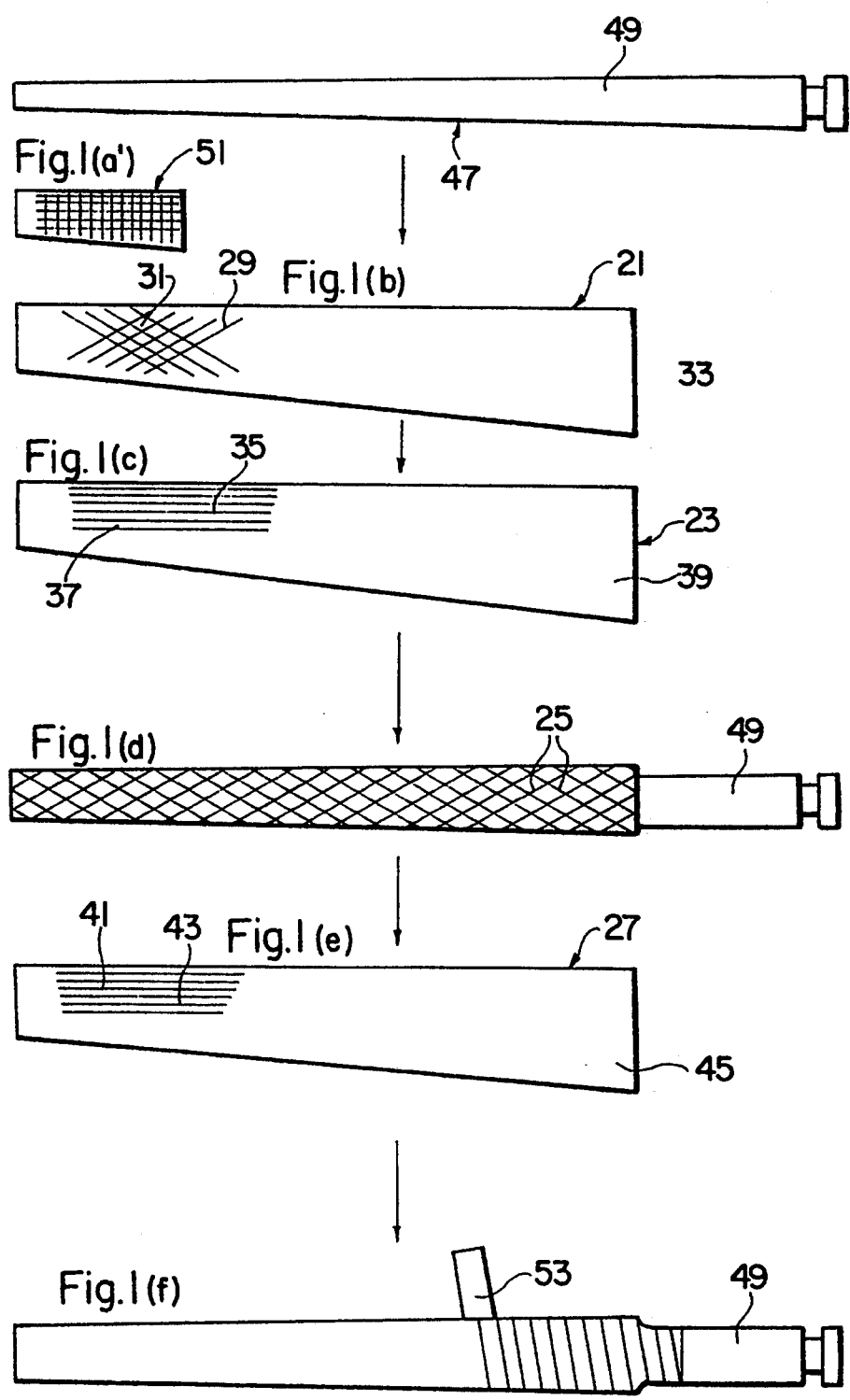
FIG. 1(a)–1(f) show a process diagram to illustrate an embodiment of the production method for the golf club shaft of this invention.
Figure 2:
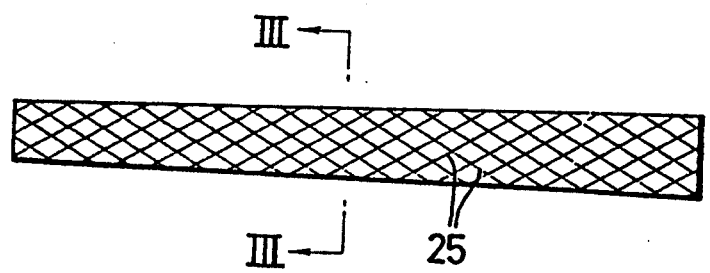
FIG. 2 is a side view of the golf club shaft produced according to the golf club shaft production method shown in FIG. 1.
Figure 3:
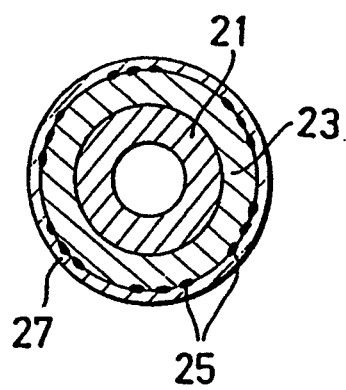
FIG. 3 is a transverse cross section along the line III to III in FIG. 2.
Figure 4:
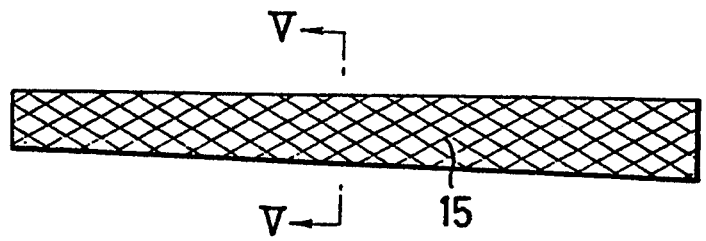
FIG. 4 is a side view of a conventional golf club shaft.
Figure 5:
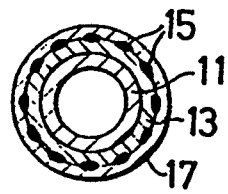
FIG. 5 is a transverse cross section along the line V to V in FIG. 4.
Figure 6:
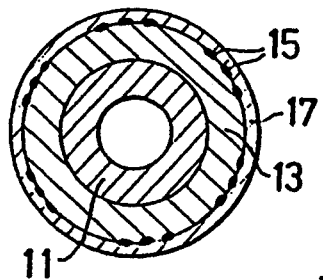
FIG. 6 is a transverse cross section to show the states when the outer layer is rolled for the golf club shaft shown in FIG. 4.
Figure 7:
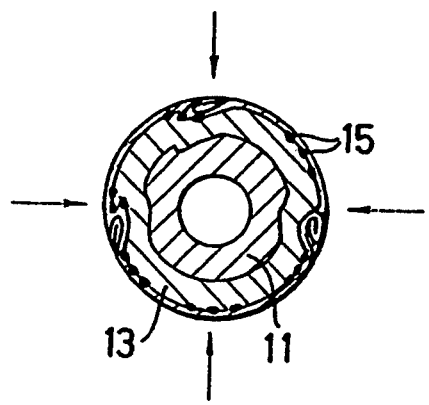
FIG. 7 is a transverse cross section to show the states after taping and curing of the golf club shaft in FIG. 4.
Figure 8:
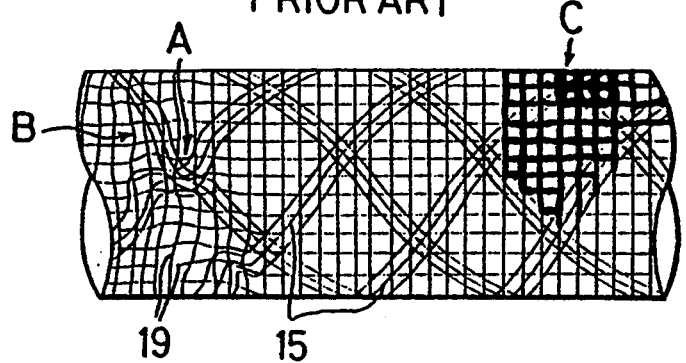
FIG. 8 is a side view of FIG. 7.

FIG. 1 shows an embodiment of the golf club shaft production method of the present invention. FIG. 2 and FIG. 3 show the golf club shaft produced according to the method shown in FIG. 1.

Referring to FIG. 2 and 3, 21 and 23 indicate the inner layer and middle layer, respectively.

The middle layer 23 has its periphery wound with a string member 25 in the form of mesh, and around this string member 25, an outer layer 27 is formed.

As shown in FIG. 1(b), the inner layer 21 is formed by winding a plurality of prepreg sheets which are made of high-strength fiber 29 such as carbon fiber, boron fiber, alumina fiber, aramide fiber or glass fiber, impregnated with matrix 31, or synthetic resin such as epoxy, polyester, or phenol. In this prepreg sheet 33, high-strength fiber 29 is woven so that the fiber direction crosses the longitudinal axis of the shaft.

Middle layer 23 is, as shown in FIG. 1(c), formed by winding for a plurality of times a plurality of prepreg sheets 39, which are high-strength fiber 35 such as carbon fiber, boron fiber, alumina fiber, aramide fiber or glass fiber, impregnated with matrix 37 made of synthetic resin such as epoxy, polyester, or phenol. In this prepreg sheet 39, direction of high-strength fiber 35 is arranged to be the same as the longitudinal axial direction of the shaft.

As shown in FIG. 1(d), the middle layer 23 has its periphery wound with single yarns of organic or inorganic fiber, or a string member of fiber convergence, for example the string member 25 comprising amorphous fiber, carbon fiber, or Kevlar fiber in the form of mesh.

As shown in FIG. 1(e), the string member 25 has its periphery wound with the prepreg sheet 45 comprising fiber 41 and matrix 43 which become transparent when cured, to form an outer layer 27.

For example, glass fiber or polyether imide fiber may be used as the fiber 41, and epoxy, polyester or phenol as the matrix 43.

In this embodiment, the fiber 41 of the prepreg sheet 45 forming the outer layer 27 is arranged in the longitudinal axial direction of the shaft. This means that the fiber 41 is not woven but just placed in the longitudinal axial direction, and the fiber 41 is fixed by matrix 43. A well known prepreg sheet of this kind is a UD sheet (unidirectionally arranged sheet).

The golf club shaft with the structure described above is manufactured as follows:

First, as shown in FIG. 1(a), a mandrel 49 with a tapered surface 47 as its outer circumference is wound with a plurality of prepreg sheets 33, which are made of high-strength fiber 29 impregnated with matrix 31, to form the inner layer 21. In this step, auxiliary pattern 51 (FIG. 1(a′)) is also wound for reinforcement and adjustment.

Next, the inner layer 21 is wound for a plurality of times with a plurality of prepreg sheets 39, which are made of high-strength fiber 35 impregnated with matrix 37, to form the middle layer 23 around it.

Then, the middle layer 23 is wound with a string member 25 in the form of mesh.

The string member 25 has its periphery wound with the prepreg sheet 45, whose fiber 41 and matrix 43 become transparent after curing, so that the fiber 41 is arranged in the longitudinal axial direction of the inner layer 21, to form the outer layer 27.

Lastly, the outer layer 27 is wound with tape 53, and taped shaft is cured to obtain a golf club shaft.

With the golf club shaft produced as mentioned above, the fiber 41 of the prepreg sheet 45 is arranged in the longitudinal axial direction of the inner layer 21, and even when the shaft shrinks inward, the fiber 41 does not zigzag and eliminates the zigzag of the string member 25. In addition, clamping stress by taping is sufficiently provided.

The golf club shaft manufactured as described above eliminates zigzag or wrinkles of the string member 25 or fiber 41 of the outer layer 27. At the same time, it may effectively prevent sagging or whitening which surely eliminates the disadvantages of a conventional shaft, which are hidden braiding patterns formed by the string member and appearance of texture in the outer layer depending on light when the outer layer surface is polished.

Additionally, since zigzag or wrinkles of the string member 27 or the fiber 41 of the outer layer 27 is surely prevented, shaft strength may be considerably improved.

In the above-mentioned production method of a golf shaft, the production process consists of: a step where prepreg sheets 33 having high-strength fiber 29 impregnated with matrix 31 are wound to form an inner layer 21, a step where the inner layer 21 is wound with prepeg sheets 39 having high-strength fibers 35 impregnated with matrix 37 which are wound to form a middle layer 23, a step where middle layer 23 is wound with a string member 25, a step where the string member 25 has its periphery wound with prepreg sheet 45, whose fiber 41 and matrix 43 become transparent after curing, so that the fiber 41 is arranged in the longitudinal axial direction of the inner layer 21, to form the outer layer 27, a step where the outer layer 27 is wound with a tape 53, and a step where the shaft wound with tape 53 is cured, which facilitates the arrangement of fiber 41 in the longitudinal axial direction of the inner layer 21.

While the embodiment with the middle layer 23 formed around the inner layer 21 has been described above, it is needless to say that the invention is not limited to this embodiment, and forming of a middle layer 23 is not indispensable.

Although the invention has been described in its preferred form with a certain degree of particularity, it is understood that the present disclosure of the preferred form may be changed in the details of construction and other combinations and arrangement of parts may be resorted to without departing from the spirit and the scope of the invention as hereinafter claimed.

What is claimed is:

1. A golf club shaft comprising a mandrel, and an inner layer constituted of a plurality of prepreg sheets made of high-strength fibers which cross the longitudinal axis of the shaft and which are impregnated with a matrix of synthetic resin, the prepreg sheets being wound around said mandrel, a middle layer formed by prepreg sheets made of high-strength fibers impregnated with synthetic resin wound around said inner layer, and an outer layer formed by winding a prepreg sheet having fibers and an impregnating matrix which become transparent after curing, wherein the fibers of the prepreg sheet forming said outer layer are arranged in the longitudinal axial direction of the shaft, and further comprising a string member wound around said middle layer.

2. A golf club shaft according to claim 1, wherein said inner layer is formed by winding a plurality of prepreg sheets having high-strength fibers selected from the group consisting of carbon fibers, boron fibers, alumina fibers, aramide fibers and glass fibers, impregnated with a matrix of synthetic resin selected from the group consisting of epoxy, polyester, and phenol.

3. A golf club shaft according to claim 2, wherein the high-strength fibers in said prepreg sheets of said inner layer are arranged in a manner running generally in the longitudinal axial direction of the shaft and criss-crossing each other.

4. A golf club shaft according to claim 1, wherein said middle layer is formed by winding for a plurality of times a plurality of prepreg sheets made of high-strength fibers, selected from the group consisting of carbon fibers, boron fibers, alumina fibers, aramide fibers and glass fibers impregnated with a matrix of synthetic resin selected from the group consisting of epoxy, polyester and phenol.

5. A golf club shaft according to claim 4, wherein the high-strength fibers in said prepreg sheets of the middle layer are arranged unidirectionally along the longitudinal axial direction of the shaft.

6. A golf club shaft according to claim 1, wherein the string member consists of single yarns selected from the group consisting of organic fibers, inorganic fibers and convergence of fibers selected from the group consisting of amorphous fibers, carbon fibers and Kevlar fibers which are wound around the middle layer in the form of g mesh arranged in a pattern running generally in the longitudinal axial direction of the shaft and criss-crossing each other.

7. A golf club shaft according to claim 1, wherein the outer layer is formed around said string member by winding a prepreg sheet of fibers and matrix which becomes transparent after curing.

8. A golf club shaft according to claim 1, wherein said fibers of the outer layer are formed from a material selected from the group consisting of glass fibers, and polyester imide fibers.

9. A golf club shaft according to claim 1, wherein said matrix of the outer layer is formed of a material selected from the group consisting of epoxy, polyester and phenol.

10. A golf club shaft according to claim 1, wherein said fibers of the outer layer are not woven but just arranged unidirectionally in the longitudinal axial direction of the shaft and fixed by matrix.

* * * * *

UNITED STATES PATENT AND TRADEMARK OFFICE
CERTIFICATE OF CORRECTION

PATENT NO. : 5,385,767
DATED : January 31, 1995
INVENTOR(S) : Noguchi, A.

It is certified that error appears in the above-identified patent and that said Letters Patent is hereby corrected as shown below:

Claim 6, Column 4, line 50, change "g" to read --a--.

Signed and Sealed this

Eleventh Day of April, 1995

Attest:

BRUCE LEHMAN

Attesting Officer    Commissioner of Patents and Trademarks